United States Patent Office 3,418,987
Patented Dec. 31, 1968

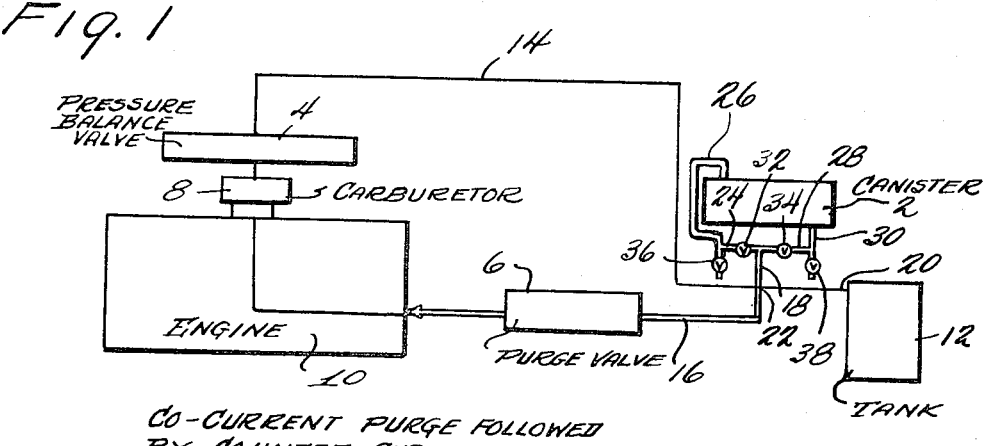
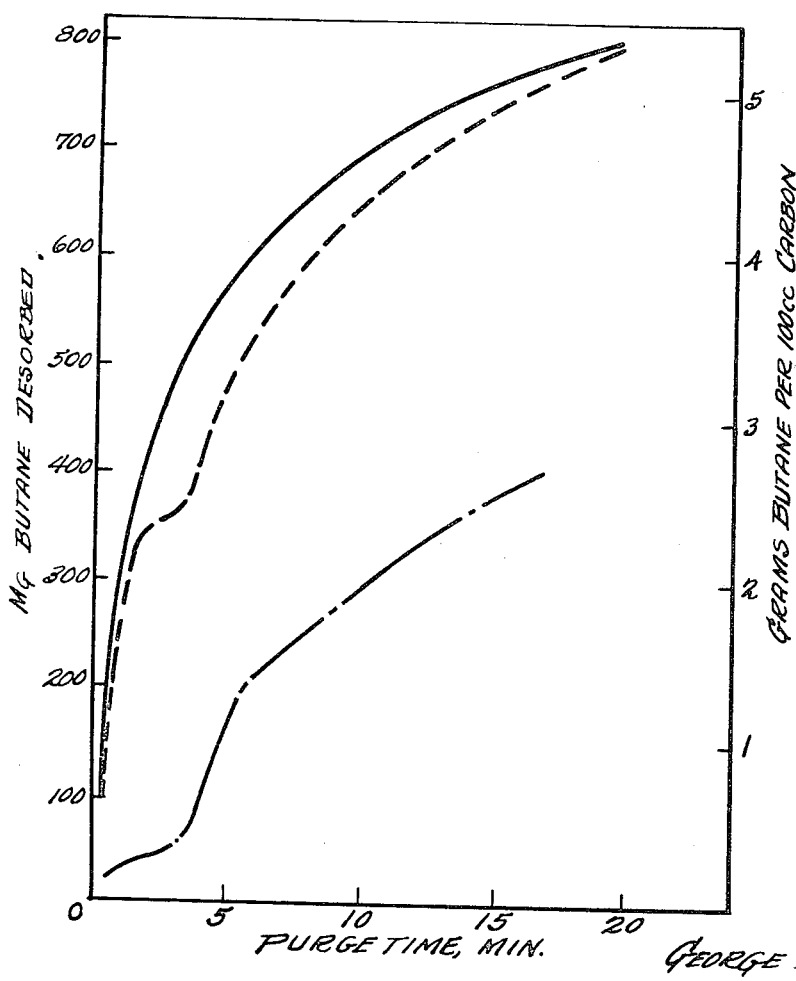

3,418,987
CO-CURRENT PURGE
George R. Stoneburner, Coraopolis, Pa., assignor to Pittsburgh Activated Carbon Company, Pittsburgh, Pa., a corporation of Pennsylvania
Filed July 27, 1967, Ser. No. 656,387
8 Claims. (Cl. 123—136)

ABSTRACT OF THE DISCLOSURE

An evaporative loss control device for automobiles is modified to provide an initial air purge in a co-current direct for a short time during which the hydrocarbon is redistributed in the adsorbent bed. Then the purge direction is changed to counter-current direction for the remainder of the purge cycle. This process gives a more uniform desorption than an all counter-current purge. The preferred adsorbent is activated carbon.

---

The present invention relates to the use of a fuel vapor recovery system.

The problem of evaporative emissions for automobile fuel systems is one of growing significance to the petroleum and automotive industries. As pointed out in Wentworth Patent 3,093,124 the smog and pollution problem has directed attention to eliminating gasoline vapors which may escape from the fuel tank and carburetor float bowl. In addition the Motor Vehicle Pollution Control Board of California has proposed standards for the control of the evaporation losses, considering them to represent a sizeable contribution to the smog problem. Further interest in controlling evaporative losses has been shown by the United States Government with the publication of proposed standards for such losses in the Federal Register.

As part of the means for eliminating the gasoline vapors Wentworth discloses the use of a canister filled with an adsorbent, e.g. activated carbon, for the volatile portions of the gasoline. Gasoline vapors given off by the engine fuel reservoir and the engine carburetor while the engine is not operating are recovered and retained in the canister and are subsequently released during engine operation, conducted to the engine and burned therein. This adsorption is accomplshed by using the full flow of the engine air or a partial flow of the engine air through the adsorbent.

As explained in the Esso Research and Engineering Company Paper entitled "An Adsorption-Regeneration Approach to the Problem of Evaporative Control," presented at the Society of Automotive Engineers, Detroit, Mich., Jan. 13, 1967, the basic evaporative loss control system has three essential components, (1) the canister containing the adsorbent for gasoline vapors, (2) the pressure balance valve, and (3) the purge control valve. The canister traps hydrocarbon vapors before they can escape to the atmosphere and holds them there until such time as they can be sent to the engine. The purpose of the pressure balance valve is to maintain metering forces in the carburetor exactly as they were originally designed while at the same time closing all external vents and routing hydrocarbon vapors from the carburetor bowl to the canister. The vapors from the fuel tank are also permitted to go to the canister. The function of the purge control valve is to allow the stripping of the hydrocarbon from the canister and the consequent feeding of the hydrocarbon laden purge air stream to the intake manifold. This is permitted to take place only under certain modes of engine operation.

Such an evaporative loss control device reduces the evaporative emission losses to the atmosphere. Thue the Motor Vehicle Pollution Control Board of California has proposed the following standards for the control of hydrocarbon evaporation losses—2 grams per hot soak from the carburetor and 6 grams per day from the fuel tank as against normal operating conditions wherein 10 grams of hydrocarbons are lost per hot soak from the carburetor and 30 grams of hydrocarbon are lost per day from the fuel tank. By the use of the ELCD Esso reduced the tank losses to essentially 0 grams per day in three test cars and reduced the carburetor loss per hot soak to 0.9 to 1.4 grams.

In the system described in Wentworth Patent 3,093,124 the vapors given off of the carburetor float bowl and gasoline tank while the engine is off are captured in an adsorbent canister encircling the exhaust pipe. Each time the car is driven the canister will be heated and the adsorbent material purge off the trapped fuel vapors. In Wentworth Patent 3,221,724 a fuel vapor recovery system is provided in which a low reactivating temperature adsorbent is used.

When the engine is off, vent lines from the carburetor float bowl and the fuel tank delivery raw gas vapor mixtures to the adsorbent where they are accepted and stored. When the engine is started the air sucked through the air intake and carburetor passes through and around the adsorbent bed bringing it to its reaction temperature, thus driving off the trapped fuel vapors. These vapors are carried off to the combustion chamber of the engine and burned.

The air to fuel ratio within the engine is desirably in the range of to 12–16 to 1. At present the problem is that no method has been devised for desorbing the lost hydrocarbon material from the canister containing activated carbon or the like and feeding it back to the intake system for combustion without causing an over-rich air-fuel mixture during the initial portion of the purge cycle. This results in such a rich mixture that engine performance is irregular and poor (i.e. hesitation; stumble) and CO content is increased. This is because of the rapid rate of hydrocarbon release during the first ten minutes of desorption.

In the evaporative loss control device (ELCD) proposed by Esso Research and Engineering the initial release of hydrocarbon in the desorption cycle is too great. This results in a "sag" in engine performance and in production of more carbon monoxide in the exhaust gas.

Accordingly it is an object of the present invention to devise an improved method for desorbing hydrocarbons from the canister of an evaporative loss control device.

Another object is to desorb the volatile hydrocarbons from the evaporative loss control device and send them back to the engine for combustion without causing over-richness which would result in a momentary "sag" or poor engine performance which could cause an increase in pollutants such as carbon monoxide in the exhaust.

Still further objects in the entire scope of applicability to the present invention will become apparent from the detailed description given hereinafter. It should be understood, however, that the detailed description and specific examples while indicating preferred embodiments of the invention are given by way of illustration only, since various changes and modifications within the spirit and scope of the invention will become apparent to those skilled in the art from this detailed description.

It has now been found that the objects can be attained by purging with air in a co-current direction for a short time during which the hydrocarbon is redistributed in the adsorbent (preferably activated carbon) bed. Then the purge direction is changed to counter-current direction for the remainder of the purge cycle. The present invention reduces the rate at which hydrocarbon is released. The rate of desorption can be further regulated in the counter-current direction by adopting the proposal in Kranc application Ser. No. 632,626 filed Apr. 21, 1967 by employing a variable purge rate of the gases adsorbed on the adsorbent, e.g., activated carbon, in the canister as disclosed in Wentworth or in the Esso Paper "An Adsorption Regeneration Approach to the Problem of Evaporative Control" or in other devices of similar character. The entire disclosure of the Kranc application is hereby incorporated by reference.

The purge rate in the Kranc development can be made either continuously variable, e.g. by the use of mechanical or electrical controlling means or the purge rate can be varied by a plurality of specific incremental steps. Thus there can be 2, 3, 4, 5 or more steps (a continuously changing purge rate being in effect an infinite number of incremental steps). In most automobiles on the road today when using the Kranc procedure the purge rate should be adjusted so that there is a difference between the beginning and a subsequent purge rate of at least double, e.g. if the initial purge rate is 0.1 c.f.m. (cubic feet per minute) the subsequent purge rate should be at least 0.2 c.f.m. and desirably the subsequent purge rate is 3, 5, or 10 times the initial purge rate. Generally the initial purge rate is the lowest and subsequent purge rates are at higher rates of purging air.

The purge rates are adjusted to give as closely as possible a uniform rate of hydrocarbon release during the purge cycle thereby minimizing over-rich conditions during the first stages of purge.

When a plurality of purge rates other than a continuously changing purge rate is employed in the Kranc procedure the change from one purge rate to another is preferably done when the air to fuel ratio is between 15:1 and 16:1 although this can be varied.

The present invention is an improvement on the Kranc procedure.

For optimum operation according to the present invention the co-current flow is for 2 minutes although it can be from 1 to 8 minutes. The countercurrent flow is for the balance of the time up to 15, 20 or even 30 minutes. For best results the countercurrent flow line should always be longer than the cocurrent flow. Of course in some cases the countercurrent is stopped before the cycle is completed and this desired operation cannot be obtained.

In the following examples the adsorbent employed was Pittsburgh type BPX activated carbon (12 x 40 mesh United States Sieve Series) but there can also be used any other conventional activated carbon such as Pittsburgh type BPL (12 x 30 mesh), Pittsburgh type PCB (12 x 30 mesh), Pittsburgh type SGL, Barneby-Cheney, Nuchar (12 x 30 mesh), Darco (12 x 20 mesh), etc. as well as other adsorbents, e.g. molecular sieves. The preferred adsorbents are activated carbons.

Since the working capacity for different types activated carbons and other adsorbents varies, the purge rate schedule in c.f.m. employed will be dependent upon the activated carbon. The schedule for any one carbon, however, can be obtained very conveniently, e.g. by saturating the activated carbon with the chosen hydrocarbon gas or mixture of gases and then observing the desorption rate at various rates of air flow through the carbon containing canister.

The rates of air flow can also be adjusted to insure the desired desorption in any desired purge time, e.g. 5, 10, 15, 20, or 30 minutes. Obviously higher overall air flow rates are required for a purge in a time of 5 minutes than for the same amount of purge in 20 minutes. At average purge times of up to 20 minutes the ELCD is known to function for test cycles of 6 years without noticeable change in activated carbon capacity.

The invention will be understood best in connection with the drawings wherein

FIGURE 1 is a schematic diagram illustrating an evaporative loss control device according to the invention; and FIGURE 2 is a graph illustrating the advantageous effects of the use of an initial cocurrent flow followed by subsequent countercurrent flow as against an all countercurrent flow.

Unless otherwise indicated all parts and percentages are by weight.

Referring more specifically to FIGURE 1 which shows the fuel vapor recovery system, there is provided an evaporative loss control device (ELCD) including a canister 2, a pressure balance valve 4 and a purge control valve 6. The system also includes the carburetor 8, engine 10 and gasoline tank 12. There are also provided pipe 14 to the pressure balance valve, carburetor and engine and pipe 16 to the purge valve and engine. Pipes 14 and 16 meet together with pipes 18 and 20 at point 22. Pipe 20 goes to the gas tank and pipe 18 goes to the canister via pipes 24 and 26 on the left hand side of the canister and via pipes 28 and 30 on the right hand side of the canister. Valve 32 is provided in pipe 24 between pipe 18 and pipe 26; valve 34 is provided in pipe 28 between pipe 18 and pipe 30. Valve 36 is provided in pipe 26 below the point where pipe 24 joins pipe 26 and valve 38 is provided in pipe 30 below the point where pipe 28 joins pipe 30.

In the adsorption portion of the cycle valves 32 and 38 are closed while valves 34 and 36 are open, allowing hydrocarbon vapors to flow to the canister 2 in the upward direction from the engine 10, carburetor 8 and gasoline tank 12.

In the desorption or purging portion of the cycle during cocurrent flow valves 34 and 36 are closed while valves 32 and 38 are open. Air is drawn through pipe 30 upward through the canister eventually, together with the desorbed hydrocarbons going to the engine and carburetor throat by way of pipe 18 and subsequent pipes.

In the desorption portion of the cycle during countercurrent flow valves 32 and 38 are closed while valves 34 and 36 are opened. Air is drawn through pipe 26 and passes downward through the canister eventually, together with the desorbed hydrocarbons going to the engine and carburetor throat by way of pipe 18 and subsequent pipes.

*Example 1*

6.903 grams of BPX activated carbon in canister 2 was substantially saturated with 1.950 grams of volatile hydrocarbon (butane). The butane was desorbed by passing dry air at a rate of 100 ml./min./sq. cm. of bed area over the carbon with the valves of FIGURE 1 set for the countercurrent flow position. The results are shown graphically in FIGURE 2 (all countercurrent purge) and in Table 1.

TABLE 1

| Time of desorption (min.) | Butane desorbed (gms.) | Cumulative butane desorbed (gms.) |
|---|---|---|
| 1 | 0.310 | 0.310 |
| 2 | 0.101 | 0.411 |
| 3 | 0.067 | 0.478 |
| 4 | 0.050 | 0.528 |
| 5 | 0.043 | 0.571 |
| 6 | 0.034 | 0.605 |
| 7 | 0.025 | 0.630 |
| 8 | 0.025 | 0.655 |
| 9 | 0.018 | 0.673 |
| 10 | 0.019 | 0.692 |
| 15 | 0.113 | 0.759 |
| 20 | 0.047 | 0.806 |

*Example 2*

6.995 grams of BPX activated carbon in cannister 2 had adsorbed thereon 1.430 grams of volatile hydrocarbons (butane). The butane was desorbed by passing dry air at a rate of 100 ml./min./sq. cm. of bed area over the carbon with the halves of FIGURE 1 set for concurrent flow for two minutes and then set for the countercurrent flow position. The results are shown graphically in FIGURE 2 (2 min. co-current purge, low loading) and in Table 2.

TABLE 2

| Time of desorption (min.) | Butane desorbed (gms.) | Cumulative butane desorbed (gms.) |
|---|---|---|
| 2 (co-current) | 0.036 | 0.036 |
| 3 (countercurrent) | 0.009 | 0.045 |
| 4 (countercurrent) | 0.040 | 0.085 |
| 5 (countercurrent) | 0.047 | 0.132 |
| 6 (countercurrent) | 0.042 | 0.174 |
| 7 (countercurrent) | 0.033 | 0.207 |
| 8 (countercurrent) | 0.029 | 0.236 |
| 9 (countercurrent) | 0.027 | 0.263 |
| 11 (countercurrent) | 0.045 | 0.308 |
| 13 (countercurrent) | 0.039 | 0.347 |
| 15 (countercurrent) | 0.033 | 0.380 |
| 17 (countercurrent) | 0.026 | 0.406 |

The results in Example 2 show the substantially greater uniformity of desorption as compared to the results in Example 1.

*Example 3*

6.995 grams of BPX activated carbon in canister 2 had adsorbed thereon 1.803 grams of volatile hydrocarbon (butane). The butane was desorbed in the same manner as in Example 2. The results are shown graphically in FIGURE 2 (2 min. co-current purge, high loading) and in Table 3.

TABLE 3

| Time of desorption (min.) | Butane desorbed (gms.) | Cumulative butane desorbed (gms.) |
|---|---|---|
| 2 (co-current) | 0.349 | 0.349 |
| 3 (countercurrent) | 0.011 | 0.359 |
| 4 (countercurrent) | 0.052 | 0.411 |
| 5 (countercurrent) | 0.052 | 0.463 |
| 6 (countercurrent) | 0.059 | 0.522 |
| 7 (countercurrent) | 0.037 | 0.559 |
| 8 (countercurrent) | 0.033 | 0.592 |
| 9 (countercurrent) | 0.026 | 0.618 |
| 11 (countercurrent) | 0.047 | 0.665 |
| 13 (countercurrent) | 0.038 | 0.703 |
| 15 (countercurrent) | 0.033 | 0.736 |
| 17 (countercurrent) | 0.030 | 0.766 |

A comparison of Examples 2 and 3 and the corresponding graphs in FIGURE 2 reveal that with low loading of the volatile hydrocarbons on the activated carbon a more uniform desorption is obtained than with a high loading.

Consequently preferably there is sufficient activated carbon in the canister that it is never loaded to more than 80% of capacity and most preferably is only loaded up to at most 50% of its capacity. Lower loadings, e.g., 10% of capacity for the volatile hydrocarbon also are effective.

What is claimed is:

1. In a method of recovering fuel vapor from an engine fuel system wherein the fuel vapor is adsorbed on an adsorbent and the fuel vapor is desorbed with purging air in a purging cycle and the released fuel vapor is burned in the engine the improvement comprising initially desorbing the vapor from the adsorbent by cocurrent flow and then desorbing the vapor by countercurrent flow.

2. A process according to claim 1 wherein the countercurrent flow is for a longer period of time than the cocurrent flow.

3. A process according to claim 2 wherein the cocurrent flow is for 1 to 8 minutes.

4. A process according to claim 3 wherein the adsorbent is activated carbon.

5. A process according to claim 4 wherein the activated carbon contains fuel vapor in an amount less than 80% of its capacity for such vapor.

6. A process according to claim 1 wherein the adsorbent is activated carbon.

7. A process according to claim 6 wherein the activated carbon contains fuel vapor in an amount less than 80% of its capacity for such vapor.

8. A process according to claim 7 wherein the activated carbon contains the vapor in an amount not over 50% of its capacity for such vapor.

References Cited

UNITED STATES PATENTS 3,191,587  6/1965  Hall _____ 123—136
3,221,724  12/1965  Wentworth _____ 123—136

LAURENCE M. GOODRIDGE, *Primary Examiner.*

U.S. Cl. X.R.

123—121